Figure 1:
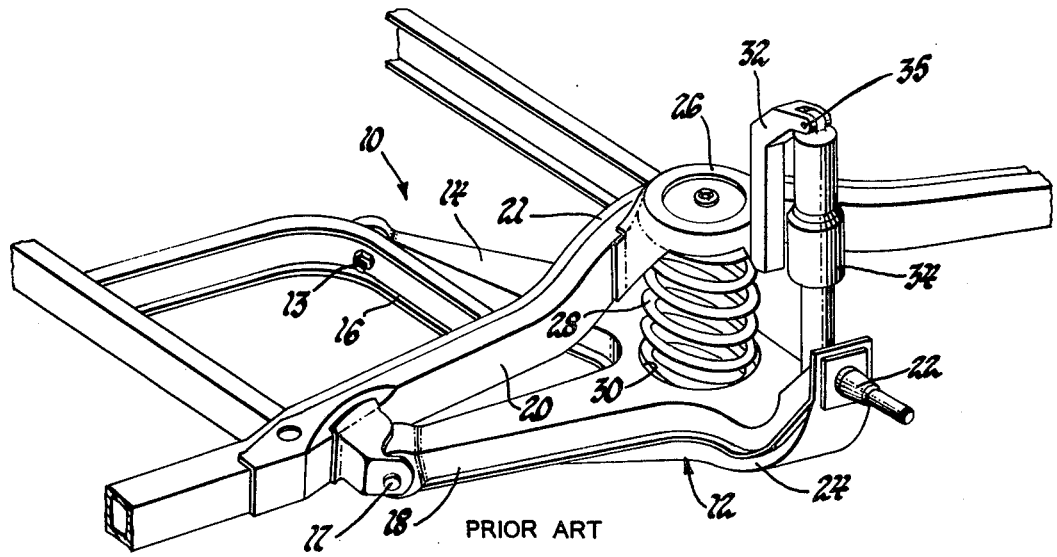

United States Patent [19]

Heinig

[11] 4,143,888

[45] Mar. 13, 1979

[54] INDEPENDENT REAR SUSPENSION SYSTEM

[75] Inventor: Howard G. Heinig, Flint, Mich.

[73] Assignee: General Motors Corporation, Detroit, Mich.

[21] Appl. No.: 868,891

[22] Filed: Jan. 12, 1978

[51] Int. Cl.² .......................... B60G 3/04; B60G 11/46
[52] U.S. Cl. ...................................... 280/697; 267/16; 280/713
[58] Field of Search .............. 280/697, 692, 709, 710, 280/713, 720; 267/18, 16, 54

[56] References Cited

U.S. PATENT DOCUMENTS

| | | | |
|---|---|---|---|
| 1,531,963 | 3/1925 | McCleary | 267/16 |
| 3,386,752 | 6/1968 | Freers et al. | 280/720 |
| 3,860,256 | 1/1975 | Jackson | 280/710 |
| 3,860,259 | 1/1975 | Allison et al. | 280/720 |

*Primary Examiner*—David M. Mitchell
*Attorney, Agent, or Firm*—Dean L. Ellis

[57] ABSTRACT

The drawings illustrate an independent rear suspension system comprising a transversely-oriented control arm pivotally connected at the inner end thereof to the rear cross member of the vehicle frame and extending outwardly past the side rail, with a wheel spindle formed on the outer end thereof. A shock absorber is mounted between the control arm and the frame side rail, and a longitudinally-oriented cantilever leaf spring is secured at the rear end portion thereof to the control arm and at the front end portion thereof to the side rail, serving as a load carrying member and spring means for the suspension system.

3 Claims, 2 Drawing Figures

U.S. Patent     Mar. 13, 1979     4,143,888

INDEPENDENT REAR SUSPENSION SYSTEM

The invention relates generally to independent rear suspension systems and, more particularly, to cantilever spring-type independent rear suspension systems.

A general object of the invention is to provide an improved independent rear suspension system which results in weight reduction, fewer parts, increased trunk space, access to the rear spindle for rear wheel drive shafts, and which is nonetheless highly efficient.

Another object of the invention is to provide an independent rear suspension system including a transversely-oriented control arm pivotally connected at the inner end thereof to a frame member, a telescoping shock absorber operatively mounted between the control arm and the frame side rail, and a longitudinally-oriented cantilever leaf spring having the rear end portion thereof secured to the control arm and the front end portion thereof secured to the frame, serving as a load carrying member and spring for the suspension system.

A further object of the invention is to provide an independent rear suspension system comprising a transversely-oriented control arm pivotally connected at the inner end thereof to a rear cross member and extending beneath and beyond the frame side rail, a wheel spindle formed on the outer end thereof, a tower member secured to the side rail above the control arm, a telescoping shock absorber having the lower end thereof mounted on a surface of the control arm adjacent the wheel spindle and the upper end thereof pivotally connected to the tower member, a longitudinally-oriented cantilever leaf spring having the rear end portion thereof abutted against a bottom surface of the control arm and the front end portion thereof abutted against a bottom surface of the side rail, a leaf retainer member mounted on the bottom surface of each of the rear and front end portions of the leaf spring, and fastener means securing the leaf retainer members and the rear and front end portions of the leaf spring to the respective bottom surfaces of the control arm and the side rail.

Figure 2:
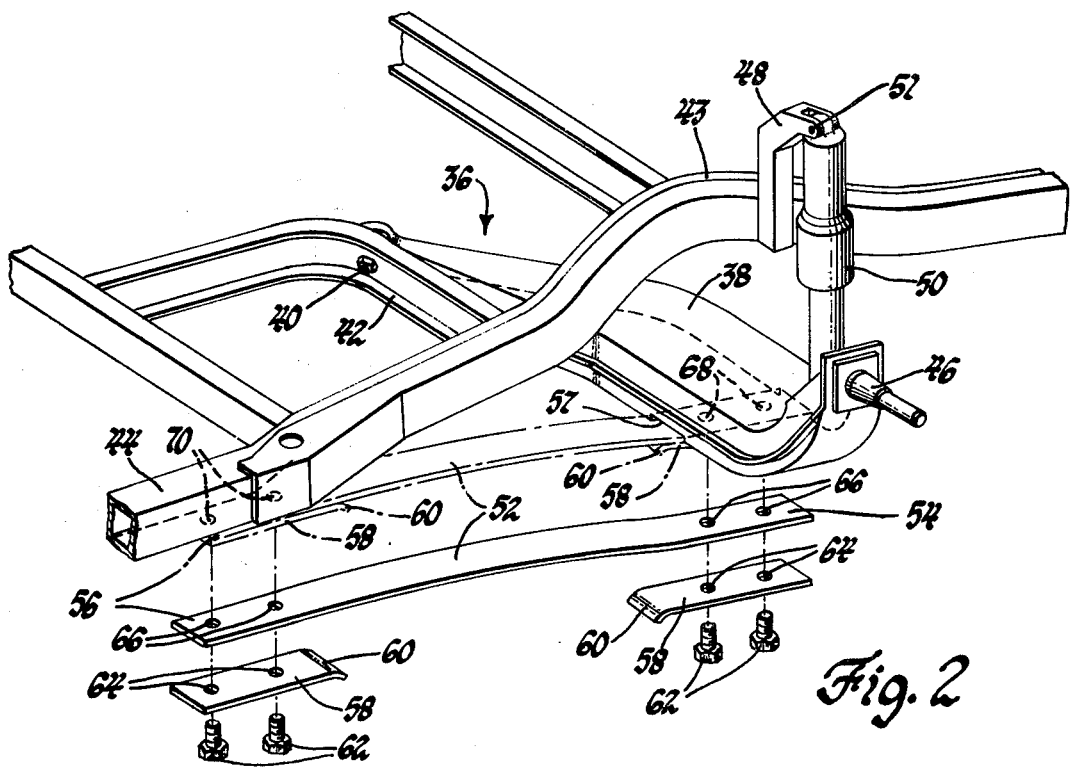

These and other objects and advantages will become more apparent when reference is made to the following description and accompanying drawings, wherein:

FIG. 1 is a fragmentary perspective view of a prior art independent rear suspension system; and FIG. 2 is a fragmentary perspective view of an independent rear suspension system embodying the invention.

Referring now to the drawings in greater detail, FIG. 1 illustrates a prior art independent rear suspension system 10 including a wishbone or A-shaped control arm 12 pivotally connected by suitable pivot means 13 at the end of one transversely-oriented leg 14 thereof to a side surface of a rear cross member 16, and by suitable pivot means 17 at the end of the other longitudinally oriented leg 18 thereof to an outer side surface of the frame side rail 20, the leg 14 extending beneath and beyond the side rail at a point 21 where the side rail bows upwardly and inwardly. A wheel spindle 22 is formed on the juncture end 24 of the legs 14 and 18.

A spring retainer 26 is formed on a side surface of the side rail 20 above the juncture end 24, and a coil spring 28 is mounted between the spring retainer 26 and a slot 30 formed on the upper surface of the juncture end 24 of the control arm 12. A tower member 32 is secured to the side rail 20 adjacent the spring retainer 26, and a telescoping shock absorber 34 is mounted between the tower member 32 and the upper surface of the control arm 12 adjacent the wheel spindle 22, the upper end thereof being pivotally connected by suitable pivot means 35 to the tower member.

Referring now to FIG. 2, there is illustrated an independent rear suspension system 36 including a transversely-oriented control arm 38 pivotally connected by pivot means 40 at the inner end thereof to a side surface of a rear cross member 42 and extending beneath and beyond an upwardly bowed portion 43 of the frame side rail 44. A wheel spindle 46 is formed on the outer end of the transversely-oriented control arm 38. A tower member 48 is secured to the side rail 44 above the control arm 38, and a telescoping shock absorber 50 is mounted between the tower member 48 and a suitable surface, such as the upper or side surface of the control arm adjacent the wheel spindle 46, as in the FIG. 1 structure, with the upper end of the shock absorber being pivotally connected by suitable pivot means 51 to the tower member.

A longitudinally-oriented cantilever leaf spring 52 has the rear end portion 54 thereof abutted against a bottom surface of the control arm 38 and the front end portion 56 thereof abutted against a bottom surface of the side rail in a location just forward of the location of the forward pivot means 17 of the leg 18 of the prior art A-shaped control arm 12 and its side rail 20. The rear portion 54 may be mounted in a slot 57 formed across the bottom surface of the control arm 38 for better retention purposes. A leaf retainer member 58 having a curved end portion 60 is mounted on the bottom surface of each of the rear 54 and front 56 end portions of the leaf spring 52, with the curved end portions 60 directed toward the center of the leaf spring to accommodate flexing thereof during jounce and rebound conditions. Suitable fastener means, such as metal screws 62, are mounted through openings 64 and 66 formed in the retainer members 58 and the leaf spring 52, respectively, and into threaded holes 68 and 70 formed in the control arm 38 and the side rail 44, respectively, for securing the leaf retainer members and the rear and front end portions of the leaf spring to the respective bottom surfaces of the control arm and the side rail.

It's apparent that the invention provides an independent rear suspension system wherein a cantilever leaf spring replaces both a longitudinally-extending leg portion of a conventional A-shaped control arm and a coil spring, thereby serving as a load carrying member and spring means, reducing vehicle weight and providing access to the wheel spindle for a rear wheel drive axle. It is also possible in this arrangement to move the side rail outwardly, into the space previously occupied by the coil spring, to thereby provide for increased trunk compartment space.

While but one embodiment of the invention has been shown and described, other modifications thereof are possible.

The embodiments of the invention in which an exclusive property or privilege is claimed are defined as follows:

1. For use with a vehicular frame having a side rail and rear cross member means, an independent rear suspension system comprising a transversely-oriented control arm pivotally connected at the inner end thereof to said rear cross member means and extending outwardly past said side rail, a wheel spindle formed on the outer end of said transversely-oriented control arm, a telescoping shock absorber operatively mounted between the upper surface of said control arm and a side surface of said side rail, and a longitudinally-oriented cantilever leaf spring having the rear end portion thereof secured to said control arm and the front end portion thereof secured to said side rail and serving as a load carrying member and spring means for the suspension system.

2. For use with a vehicular frame, an independent rear suspension system comprising a transversely-oriented control arm pivotally connected at the inner end thereof to said frame, a wheel spindle formed on the outer end of said transversely-oriented control arm, a tower member secured to said frame, a telescoping shock absorber operatively mounted between the upper surface of said control arm and said tower member, and a longitudinally-oriented cantilever leaf spring having the rear end portion thereof secured to said control arm and the front end portion thereof secured to said frame, said leaf spring serving as a load carrying member and spring for the suspension system.

3. For use with a vehicular frame having a side rail and rear cross member means, an independent rear suspension system comprising a transversely-oriented control arm pivotally connected at the inner end thereof to said rear cross member means and extending beneath and beyond said side rail, a wheel spindle formed on the outer end of said transversely-oriented control arm, tower means secured to said side rail above said control arm, a telescoping shock absorber having the lower end thereof mounted on the upper surface of said control arm adjacent said wheel spindle and the upper end thereof pivotally connected to said tower means, a longitudinally-oriented cantilever leaf spring having the rear end portion thereof abutted against a bottom surface of said control arm and the front end portion thereof abutted against a bottom surface of said side rail forward of said control arm, a leaf retainer member mounted on the bottom surface of each of said rear and front end portions of said leaf spring, and fastener means securing said leaf retainer members and said rear and front end portions of said leaf spring to the respective bottom surfaces of said control arm and said side rail.

* * * * *